S. G. MORRISON.
Saw for Sawing Stone.
No. 163,879. Patented June 1, 1875.
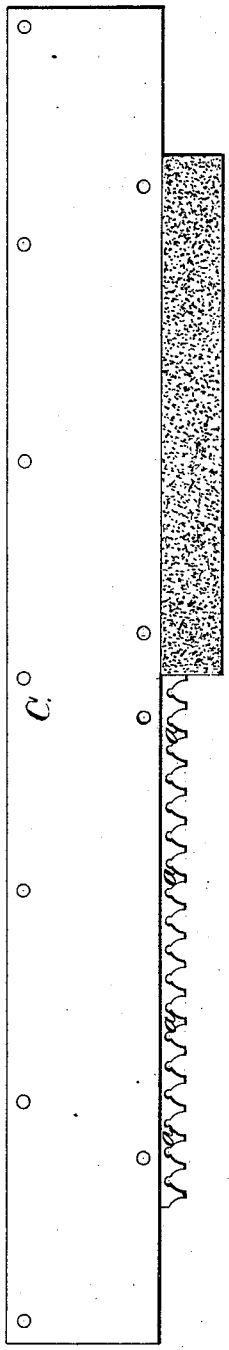
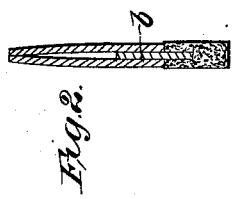
Fig. 1.
Fig. 2.
Attest:
Hepbrown H. Clue.
Geo. T. Larman.
Inventor:
Samuel G. Morrison

UNITED STATES PATENT OFFICE.

SAMUEL G. MORRISON, OF WILLIAMSPORT, PENNSYLVANIA.

IMPROVEMENT IN SAWS FOR SAWING STONE.

Specification forming part of Letters Patent No. 163,879, dated June 1, 1875; application filed October 8, 1874.

*To all whom it may concern:*

Be it known that I, SAMUEL G. MORRISON, of Williamsport, Lycoming county, Pennsylvania, have invented certain Improvements in Saws for Sawing Stone, of which the following is a specification:

The nature of my invention consists in constructing the body of a saw of three plates of rolled metal riveted together to form the back and body of a saw-blade, which carry the emery or cutting surface, applicable alike to a reciprocating or long saw on a disk, for the purpose of sawing and dividing marble, slate, and other rocks.

To enable others skilled in the art to make and use my invention, I will proceed to describe its construction and operation.

I construct my marble-saw in reciprocating or disk form, by laying three pieces of rolled metal (usually steel) flat together, riveting them securely at points upon a line suitably, to form a clamp to receive and hold a portable blade of metal, and secured therein by rivets, carrying an emery or cutting surface.

I usually construct the portable blades of thin soft plate metal, one edge of which is perforated or slotted for the purpose of receiving and holding the emery paste, which paste is laid in and upon both sides of the edge of the plate, leaving about one-half of the plate bare, and extending about an inch beyond the edge of the plate, and of a thickness sufficient to allow the body of the saw to follow the emery-baked blade freely.

My saw is illustrated more fully in plan view, Figure 1, wherein is shown the cutting-blade, partly covered with emery, marked $a\ a\ a\ a$. Fig. 2 is a cross-section of the saw, wherein is shown the emery-blade, when in place, and secured in the clamp by a rivet at $b$.

I claim—

The saw-plate herein described, composed of two metal plates united together at the upper edge by rivets, in combination with the corrugated metal blades $a$, provided with an edge of emery paste, substantially as specified.

SAMUEL G. MORRISON.

Witnesses:
   HEPBURN McCLURE,
   GEO. J. GARMAN.